US012812334B2

(12) United States Patent
Nimbavikar et al.

(10) Patent No.: US 12,812,334 B2
(45) Date of Patent: Nov. 24, 2026

(54) PROXIMITY BASED SELECTION OF DISPATCHABLE LOCATION FOR EMERGENCY CALLS

(71) Applicant: T-Mobile USA, Inc., Bellevue, WA (US)

(72) Inventors: Gunjan Nimbavikar, Sammamish, WA (US); William Michael Hooker, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 267 days.

(21) Appl. No.: 18/813,009

(22) Filed: Aug. 22, 2024

(65) Prior Publication Data

US 2026/0059265 A1 Feb. 26, 2026

(51) Int. Cl.
*H04W 4/80* (2018.01)
*H04W 4/029* (2018.01)
*H04W 76/50* (2018.01)

(52) U.S. Cl.
CPC ........... *H04W 4/029* (2018.02); *H04W 76/50* (2018.02)

(58) Field of Classification Search
CPC ....... H04W 4/029; H04W 76/50; H04W 4/90; H04W 4/80
See application file for complete search history.

(56) References Cited

U.S. PATENT DOCUMENTS 9,749,827 B2 8/2017 Mulluppadi et al.
2009/0097474 A1* 4/2009 Ray ...................... H04M 3/5116 370/352
2013/0217355 A1* 8/2013 Ray ...................... H04W 64/00 455/404.2
2015/0334545 A1* 11/2015 Maier ................... H04W 64/00 455/404.2

OTHER PUBLICATIONS

IP.com search history (Year: 2026).*

* cited by examiner

*Primary Examiner* — Moustapha Diaby
(74) *Attorney, Agent, or Firm* — Foley IP Law, PLLC

(57) ABSTRACT

Solutions enable proximity based selection of dispatchable locations for emergency calls when a first user equipment (UE), such as a handset, places an emergency call (e.g., 911) over a short range wireless interface (e.g., WiFi) using a second UE, such as a fixed wireless access (FWA) or other WiFi router, that is connected to a long range wireless network such as cellular. The first UE reports its geodetic coordinates when initiating an emergency call (or the network determines coordinates another way), and the cellular carrier's knowledge of subscriber addresses, such as billing addresses or emergency response addressed, is leveraged to select the most likely dispatchable location (e.g., the closest street address). This allows a cellular account holder (the FWA subscriber), to identify frequent guests, whose UEs are associated with different user accounts, to associate the guests' UEs with the FWA's associated street address for the purpose of making emergency calls.

20 Claims, 8 Drawing Sheets

PROXIMITY BASED SELECTION OF DISPATCHABLE LOCATION FOR EMERGENCY CALLS

BACKGROUND

When someone requires assistance, and places an emergency phone call, it is often important for emergency responders to know the location of that person. A cellular device, for example a user equipment (UE), has logic to determine and automatically report its physical position over the cellular network to which it is connected, when making an emergency call, such as a 911 call (or an enhanced 911, e911, call). With the recent expansion in the popularity of WiFi calling, this logic may also be leveraged when placing an emergency call over WiFi.

However, the physical position reported by the UE may be geodetic coordinates, such as what is provided by a global positioning system (GPS) receiver or assisted GPS (A-GPS) to determine its location. A public safety answering point (PSAP) may use a mapping capability to convert the UE's reported physical position to a street address to use as a dispatchable location where emergency responders may be sent. Unfortunately, multiple sources of ambiguity in the UE's determination of its physical position may produce uncertainty or variability that reduces the confidence attributable to the identified street address.

SUMMARY

The following summary is provided to illustrate examples disclosed herein, but is not meant to limit all examples to any particular configuration or sequence of operations.

Solutions are disclosed that provide for proximity based selection of dispatchable location for emergency calls. Examples perform operations that include, based on at least a first user equipment (UE) initiating an emergency call over a short range wireless interface, determine a physical position of the first UE, wherein the first UE is attached to a second UE via the short range wireless interface, wherein the second UE is attached to a wireless network, and wherein the second UE relays the emergency call to the wireless network; using an identifier (ID) of the second UE and the physical position of the first UE, select a most likely dispatchable location from among a set of subscriber addresses associated with the second UE; and forward, to an emergency call destination, the emergency call and the most likely dispatchable location.

BRIEF DESCRIPTION OF THE DRAWINGS

The disclosed examples are described below with reference to the accompanying drawing figures listed below, wherein.

Figure 1:
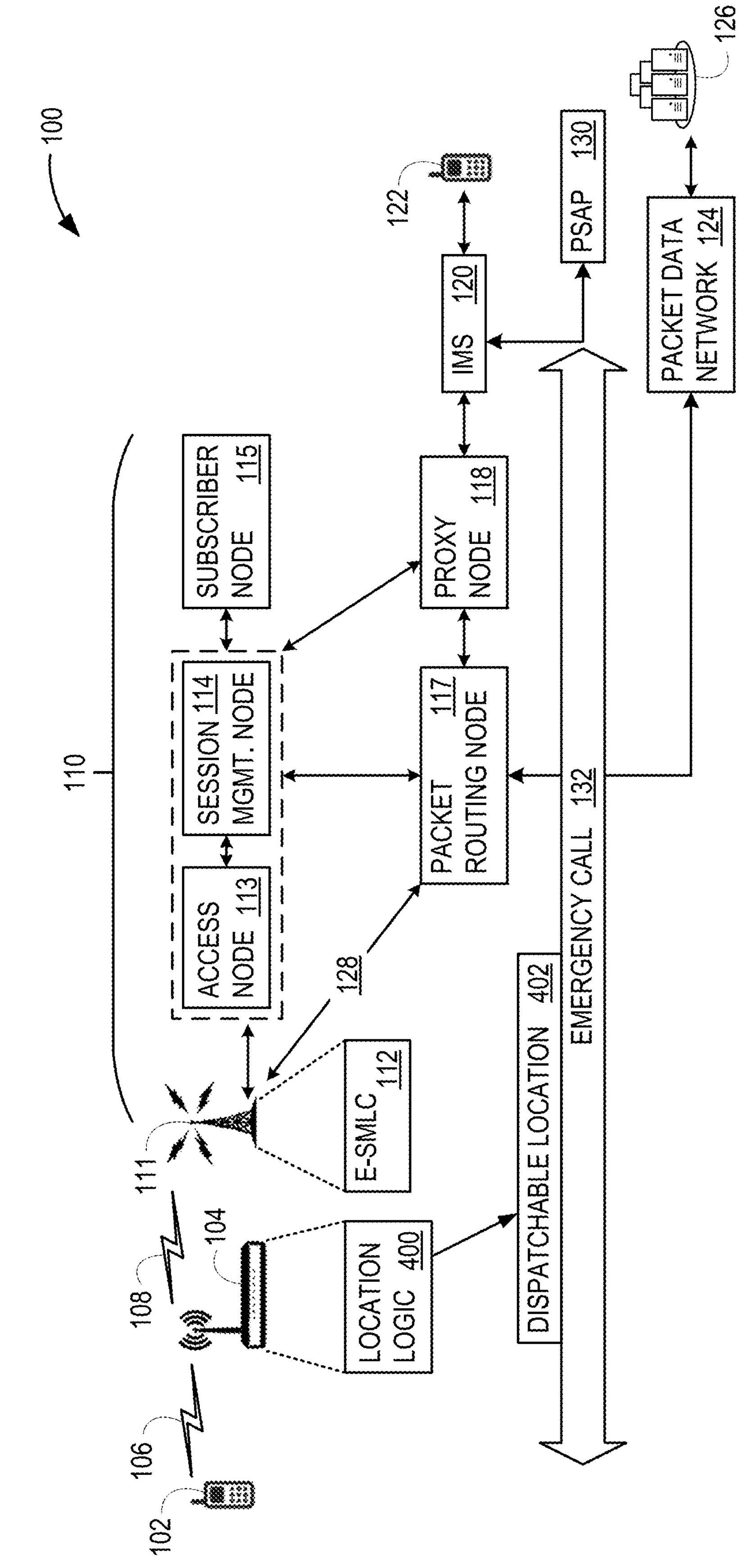
FIG. 1 illustrates an exemplary architecture that advantageously provides for proximity based selection of a dispatchable location for emergency calls placed by a user equipment (UE) over a short range wireless interface, (e.g., WiFi)

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions enable proximity based selection of dispatchable locations for emergency calls when a first user equipment (UE), such as a handset, places an emergency call (e.g., 911) over a short range wireless interface (e.g., WiFi) using a second UE, such as a fixed wireless access (FWA) or other WiFi router, that is connected to a long range wireless network such as cellular. The first UE reports its geodetic coordinates when initiating an emergency call, and the cellular carrier's knowledge of subscriber addresses, such as address registered for emergency purposes during device onboarding (or, as a fallback, billing addresses associated with FWAs), is leveraged to select the most likely dispatchable location (e.g., the closest street address associated with the FWA). This allows a cellular account holder, who provides the FWA, to identify frequent guests, whose UEs are associated with different user accounts, to associate the guests'UEs with the FWA's associated street address for the purpose of making emergency calls.

Aspects of the disclosure improve public safety by improving confidence and accuracy of dispatchable locations sent to emergency responders when a UE places an emergency call over WiFi (or another short range wireless interface). This is made possible by including an independent source of reliable street address information (i.e., subscriber addresses associated with the WiFi interface used in the emergency call) in selections of dispatchable locations. These advantageous results are accomplished, at least in part, by using an identifier (ID) of the second UE (e.g., the WiFi router) and the physical position of the first UE (i.e., the handset making the emergency call), selecting a most likely dispatchable location from among a set of subscriber addresses associated with the second UE.

With reference now to the figures, FIG. 1 illustrates an exemplary architecture 100 that advantageously provides for proximity based selection of dispatchable locations for emergency calls. A wireless network 110 is illustrated that is serving a UE 102 through a UE 104. UE 102 may be a handset phone, such as an enhanced mobile broadband (eMBB) or cellphone that is capable of making WiFi calls, or a personal computer (PC, e.g., desktop, notebook, tablet, etc.) with software permitting it to make voice over internet protocol (VOIP) calls. UE 104 may be a fixed wireless access (FWA) unit that provides a WiFi router on one side, and has a cellular modem for relaying WiFi traffic to from wireless network.

In the scene depicted in FIG. 1, UE 102 is attached to UE 104 using a short range wireless interface 106 (e.g., WiFi, Bluetooth, or another suitable short range interface) and UE 104 is attached to wireless network 110 using a cellular air interface 108. UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network. In some contexts, 5G is also referred to as new radio (NR), and standalone 5G, which is a full 5G implementation that does not rely on 4G technology for some functionality, may be referred to SA NR.

UE 104 uses air interface 108 to communicate with a base station 111 of wireless network 110, such that base station 111 is the serving base station for UE 104 (providing the serving cell). In some scenarios, base station 111 may be referred to as a radio access network (RAN). Wireless network 110 has an access node 113, a session management node 114, a subscriber node 115, and other components (not shown). Wireless network 110 also has a packet routing node 117 and a proxy node 118. Access node 113, session management node 114, and subscriber node 115 are within a control plane of wireless network 110, and packet routing node 117 is within a data plane (a.k.a. user plane) of wireless network 110.

Base station 111 is in communication with access node 113 and packet routing node 117. Access node 113 is in communication with session management node 114, which is in communication with subscriber node 115, packet routing node 117, and proxy node 118. Packet routing node 117 is in communication with proxy node 118 and packet data network 124. In some 5G examples, base station 111 comprises a gNodeB (gNB), access node 113 comprises an access mobility function (AMF), session management node 114 comprises a session management function (SMF), subscriber node 115 comprises a unified data management (UDM), and packet routing node 117 comprises a user plane function (UPF). In some 4G examples, base station 111 comprises an eNodeB (eNB), access node 113 comprises a mobility management entity (MME), session management node 114 comprises a system architecture evolution gateway (SAEGW) control plane (SAEGW-C), subscriber node 115 comprises a home subscriber server (HSS), and packet routing node 117 comprises an SAEGW-user plane (SAEGW-U). In some examples, proxy node 118 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

Proxy node 118 is in communication with an internet protocol (IP) multimedia system (IMS) 120, which uses an access gateway (IMS-AGW) in order to provide connectivity to other wireless (cellular) networks, such as for a call with a UE 122 or a public switched telephone system (PSTN, also known as plain old telephone system, POTS). In some examples, proxy node 118 may be considered to be within IMS 120. UE 102 reaches network resource 126 using packet data network 124 (or IMS 120, in some examples). Data packets of data traffic 128 to/from UE 102 pass through at least base station 111 and packet routing node 117 on their way from/to packet data network 124 or IMS 120 (via proxy node 118).

As illustrated in further detail in the remaining figures, and described more fully below in relation to those other figures, when UE 102 uses short range wireless interface 106 to make an emergency call 132 to an emergency call destination 130, a dispatchable location logic 400 selects a most likely dispatchable location 402 to send to emergency call destination 130. In some examples, emergency call destination 130 is a public safety answering point (PSAP), and emergency call 132 is a 9111 call (in North America) or a 112 call (in Europe). Most likely dispatchable location 402 is used by emergency call destination 130 to route emergency responders to a street address, to respond to emergency call 132. Dispatchable location logic 400 is sown in FIG. 1 as being located within UE 104, although in some examples, dispatchable location logic 400 is located within UE 102 or somewhere within wireless network 110, such as within an within evolved-serving mobile location center (E-SMLC) 112.

Although FIG. 1 and some of the following figures are described using an example of a cellular network, it should be understood that the teachings herein are applicable to other types of wireless networks. To benefit from the teachings herein, the basic architecture needs the following: A first UE is connected to a second UE via a first (short range) wireless air interface; the second UE is connected a long range wireless network via a second (long range) wireless air interface; the first UE provides its physical location in geodetic coordinates; the long range wireless network has a street address at which the second UE is located; and the long range wireless network has a need to provide a street address, at which the first UE is presumably located. With such features, another type of wireless network, other than a cellular network, may also benefit from the disclosure herein.

Figure 2:
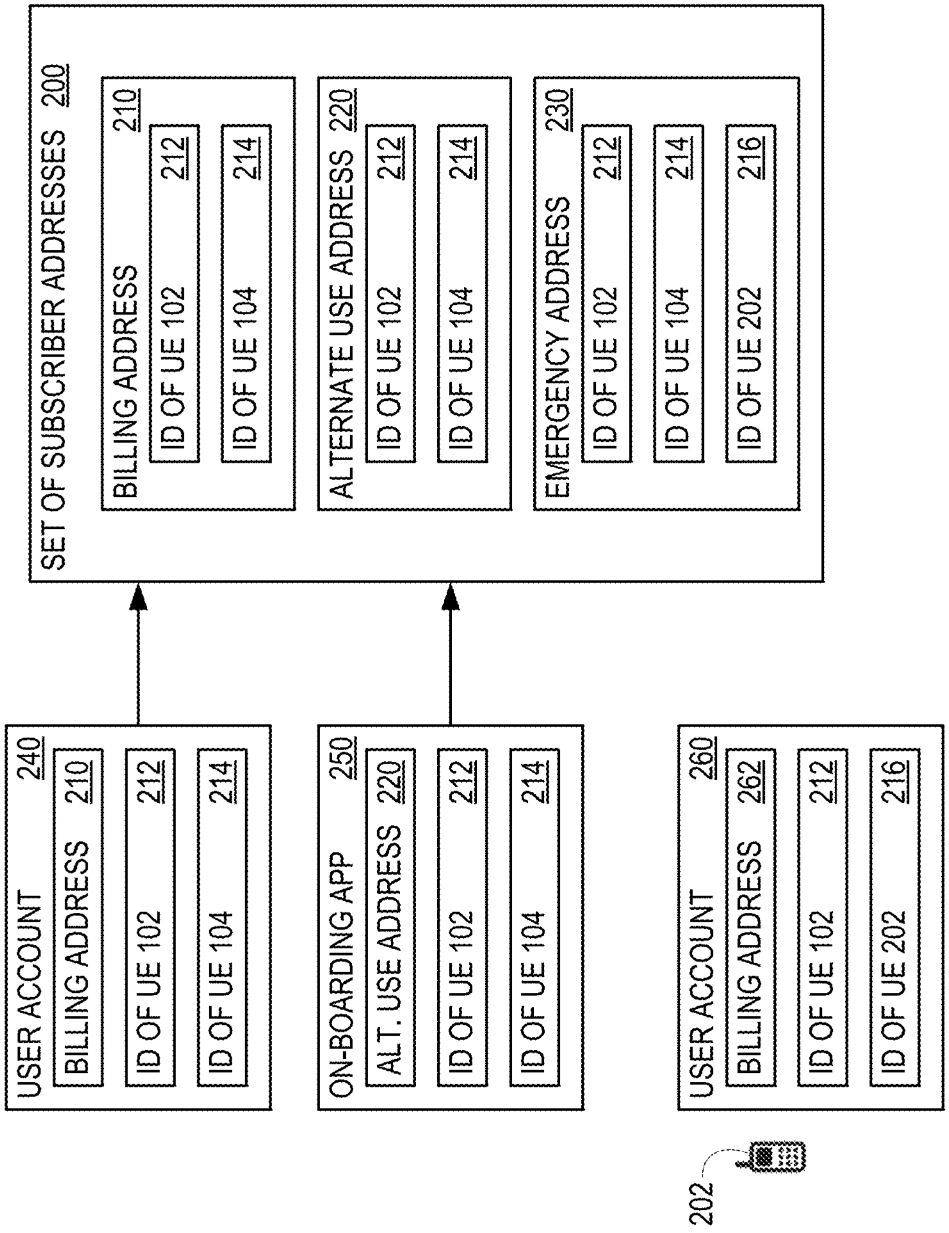
FIG. 2 illustrates exemplary data sets that may be used by examples of the architecture of FIG. 1.

FIG. 2 illustrates a set of subscriber addresses 200, a user account 240 that is associated with UE 104 and, in some scenarios, is also associated with UE 102. Another UE 202 is associated with a user account 260 that has a different billing address, a billing address 262. In scenarios in which UE 102 is not associated with user account 240, UE 102 may instead be associated with user account 260. Set of subscriber addresses 200 contains multiple street addresses, shown as a billing address 210, an alternate use address 220, and emergency response address 230. In some examples, a larger or smaller number of addresses may be present. User accounts 240 and 260 may be stored on subscriber node 115 of FIG. 1.

Within set of subscriber addresses 200, billing address 210 is associated with an ID 212 of UE 102 (when UE 102 is associated with user account 240) and an ID 214 of UE 104, an alternate use address 220 is also associated with ID 212 of UE 102 and ID 214 of UE 104, and emergency response address 230 is associated with ID 212 of UE 102, ID 214 of UE 104, and an ID 216 of UE 202. Set of subscriber addresses 200 may be initially constructed by importing data from user account 240, such as billing address 210, ID 214 of UE 104, and in scenarios in which UE is associated with user account 240 (i.e., UE 102 and UE 104 are on—or associated with—the same user account 240) importing data from user account 240 also imports ID 212 of UE 102. IDs 212, 214, and 216 may be media access controller (MAC) addresses, or some other suitable identifier.

Set of subscriber addresses 200 may be appended using an on-boarding application (app) 250 that sets up UE 104 at the intended use location. On-boarding app 250 permits the user to specify alternate use address 220 in the event that UE 104 is used somewhere other than at billing address 210, and also specify the UEs that are expected to also be used at alternate use address 220 (i.e., specifying ID 212 of UE 102 in the even that it was not imported from user account 240). On-boarding app 250 permits the user to confirm emergency response address 230 as the place in which UE 104 is likely to be used, and which may be copied from billing address 210 or alternate use address 220.

UE 202 is referred to herein as a guest UE, because UE 202 is not part of the same user account 240 as is UE 104. That is, UE 202 may be a cellphone belonging to a renter, a long term visitor, or a frequent visitor (e.g., an in-house visiting nurse), and who may have an occasion to make an emergency call, through UE 104, using short range wireless interface 106. In such scenarios, on-boarding app 250 is used to add ID 216 of UE 202 to set of subscriber addresses 200, and associate ID 216 of UE 202 with the proper street address.

Figure 3:
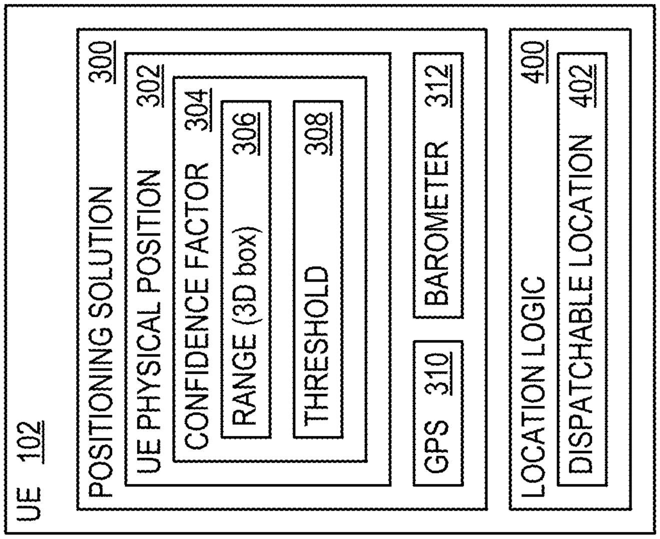
FIG. 3 illustrates further detail for the UE of architecture FIG. 1 that is placing the emergency call.

FIG. 3 illustrates further detail for UE 102. UE 102 has a positioning solution 300 that determines a physical position 302 of UE 102, along with a confidence factor 304. Confidence factor 304 may be expressed as a range of positions 306 for physical position 302, such as a 3D bounding box, with UE 102 being within range of positions 306 with some confidence threshold 308 (e.g., 90%). Positioning solution 300 may use a GPS component 310 (which represents any position determination logic), and may further (or instead) use assisted GPS (A-GPS), short range radio station identification (i.e., WiFi and Bluetooth beacons), and/or identification of in-range base stations of wireless network 110 (i.e., Cell ID and derivatives). In some examples, UE 102 also has a barometer 312 to provide an altitude measurement to assist in identifying a particular floor of a high rise building.

FIG. 3 also shows UE 102 as having dispatchable location logic 400, although dispatchable location logic 400 may be located elsewhere, such as in UE 104 or within wireless network 110, and/or may be distributed among multiple locations. As shown in further detail in FIG. 4, dispatchable location logic 400 determines (selects) most likely dispatchable location 402 for UE 102.

Figure 4:
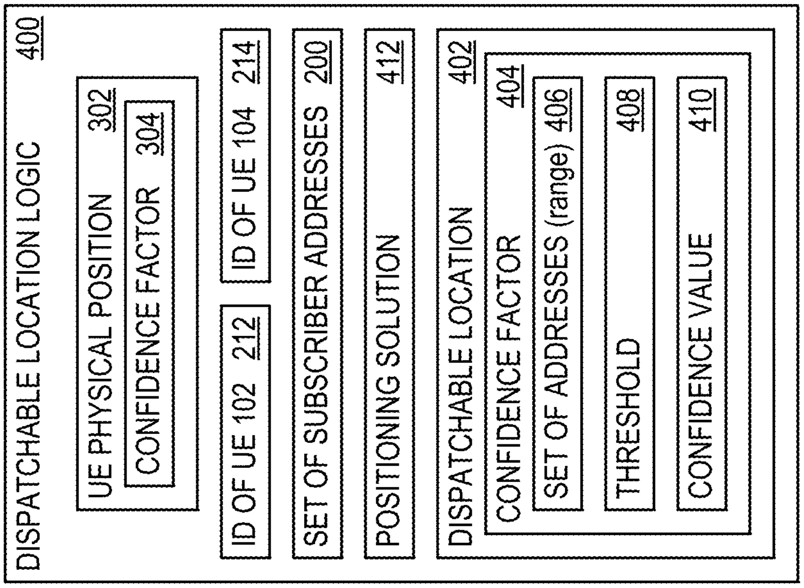
FIG. 4 illustrates exemplary logic that may perform the proximity based selection of a dispatchable location in examples of the architecture of FIG. 1.

As shown in FIG. 4, dispatchable location logic 400 has a positioning solution 412, which may comprise a contextually aware artificial intelligence (AI, or machine learning, ML, used interchangeably herein), or some other logic. Positioning solution 412 receives physical position 302 of UE 102, along with confidence factor 304, at least ID 214 of UE 104, and has a copy of set of subscriber addresses 200. In some examples, positioning solution 412 also receives ID 212 of UE 102. Positioning solution 412 selects most likely dispatchable location 402 from among the street addresses in set of subscriber addresses 200, such as, perhaps, the street address that is the closest to physical position 302 of UE 102. That is, positioning solution 412 has mapping functionality and data that correlates geodetic coordinates with street addresses.

Most likely dispatchable location 402 also has a confidence factor, specifically confidence factor 404, that reflects the uncertainty of physical position 302 as indicated by confidence factor 304. In some examples, when confidence factor 304 provides a relatively small 3D box of position uncertainty for UE 102, confidence factor 404 will reflect a street address with a higher degree of certainty. Multiple options exist for confidence factor 404, such as a set of street addresses 406 (i.e., a range of addresses) with a confidence threshold 408, or instead a single address with a confidence value 410.

Figure 5:
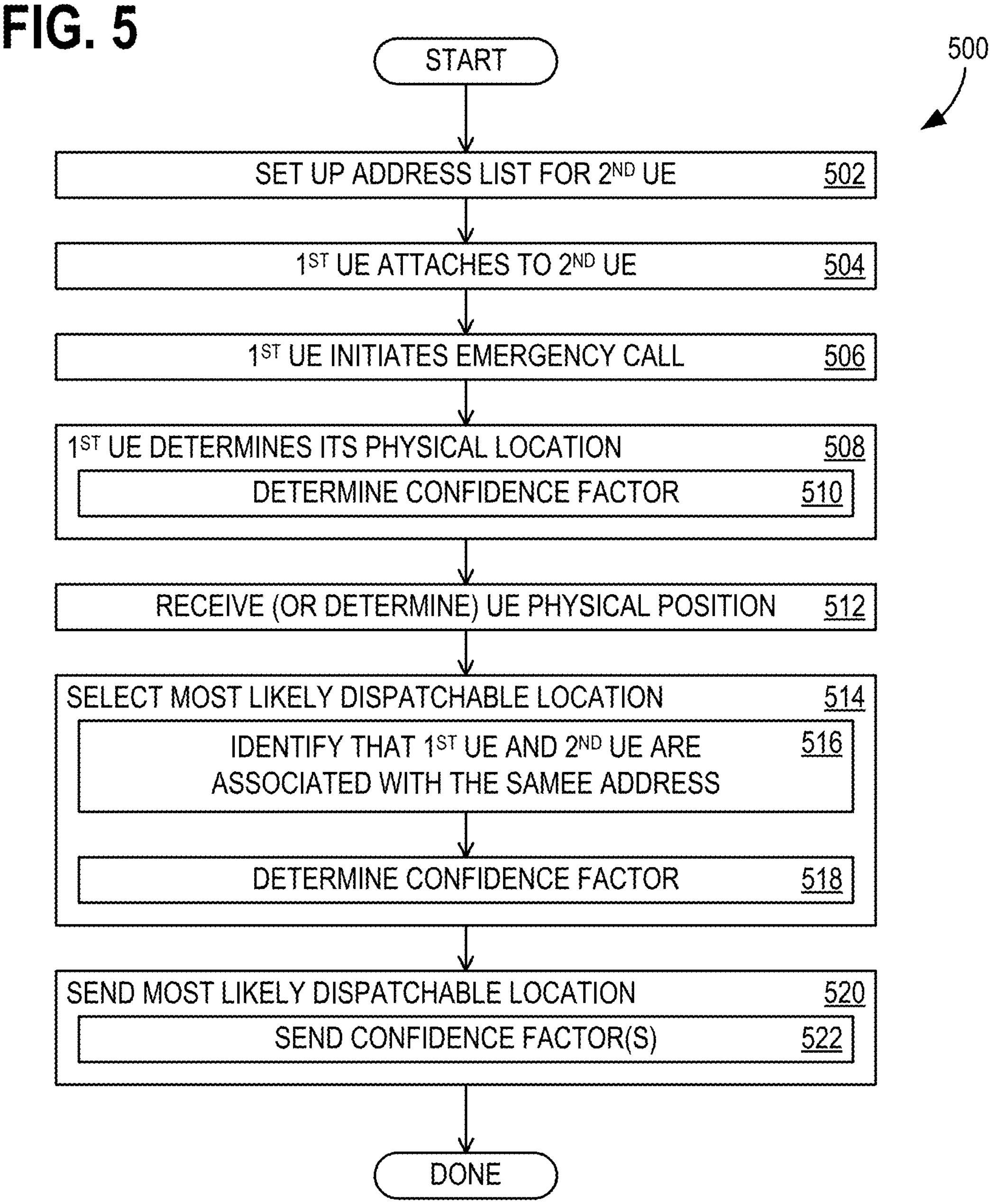
FIG. 5 illustrates a flowchart of exemplary operations associated with proximity based selection of a dispatchable location for emergency calls, as may be performed by examples of the architecture of FIG. 1.
Figure 5A:
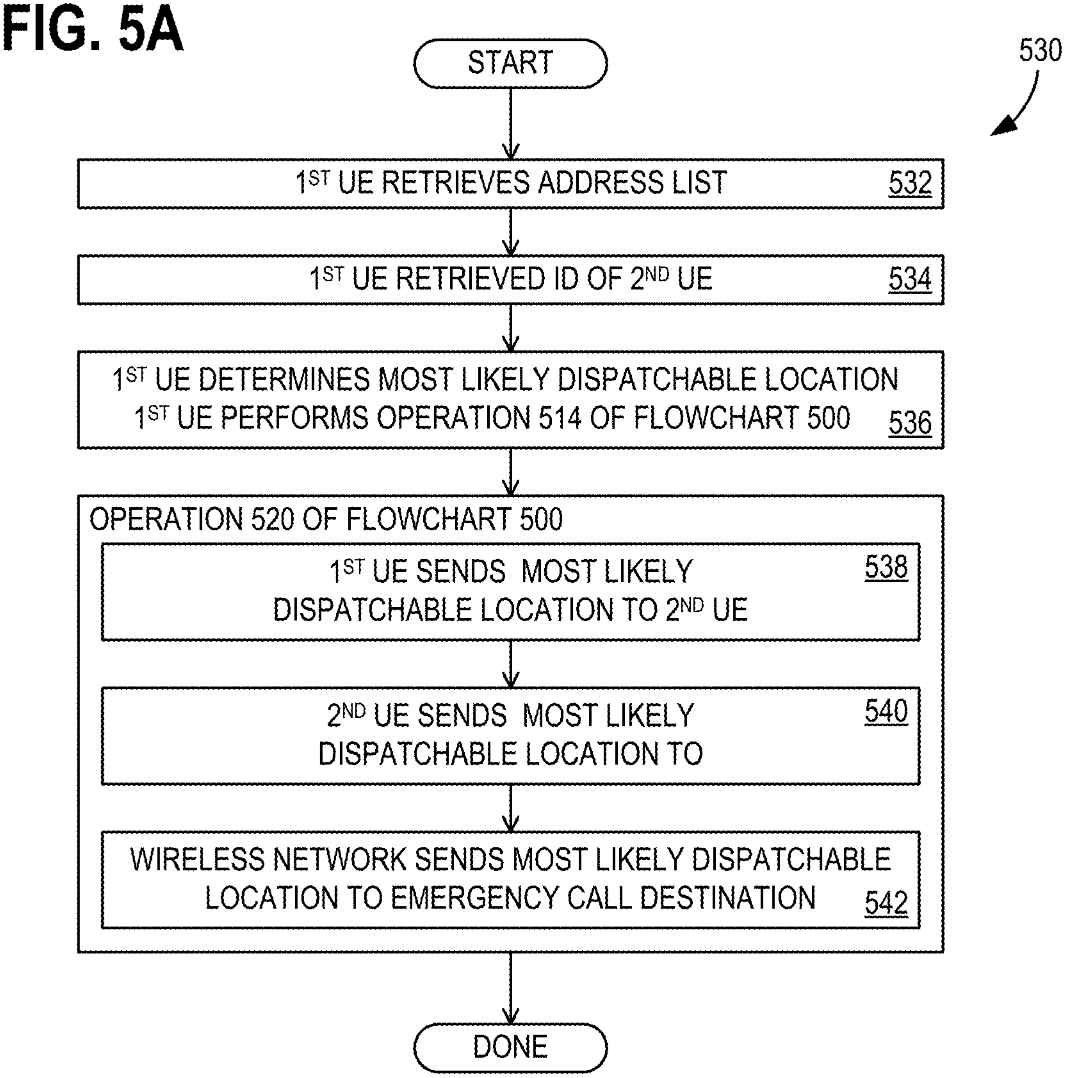
FIGS. 5A, 5B, and 5C illustrate flowcharts of optional implementations of the flowchart of FIG. 5.
Figure 5B:
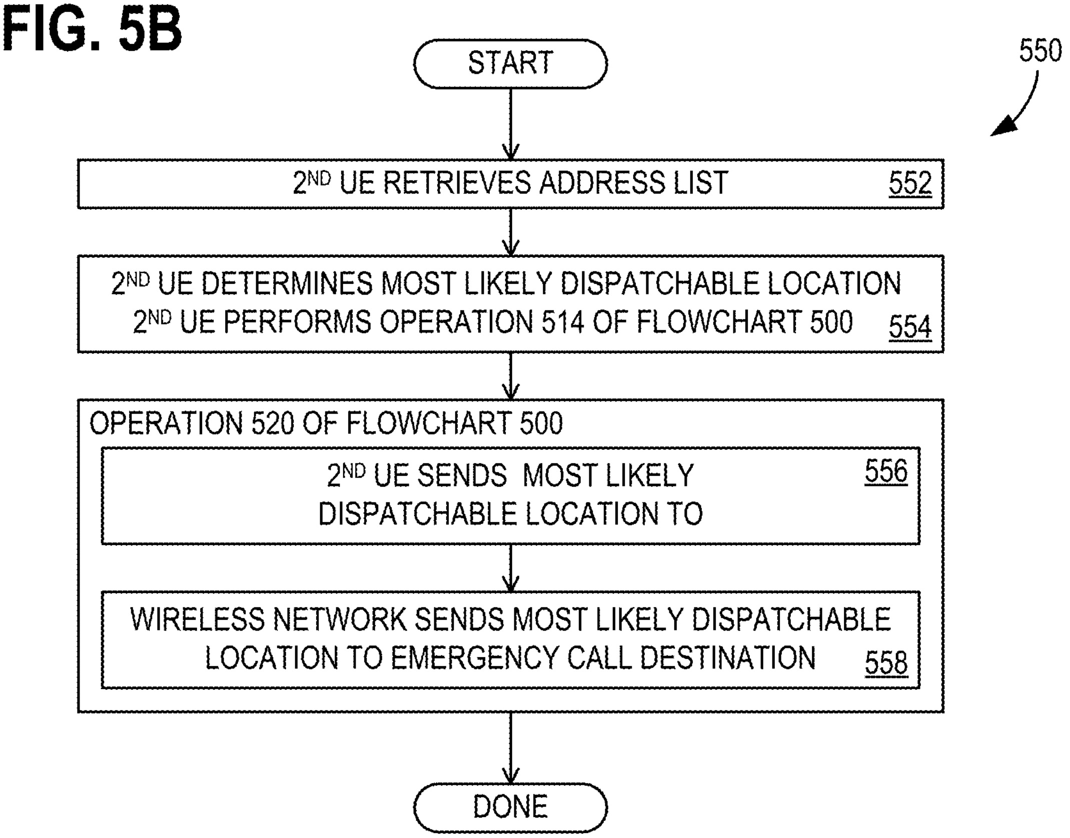
Figure 5C:
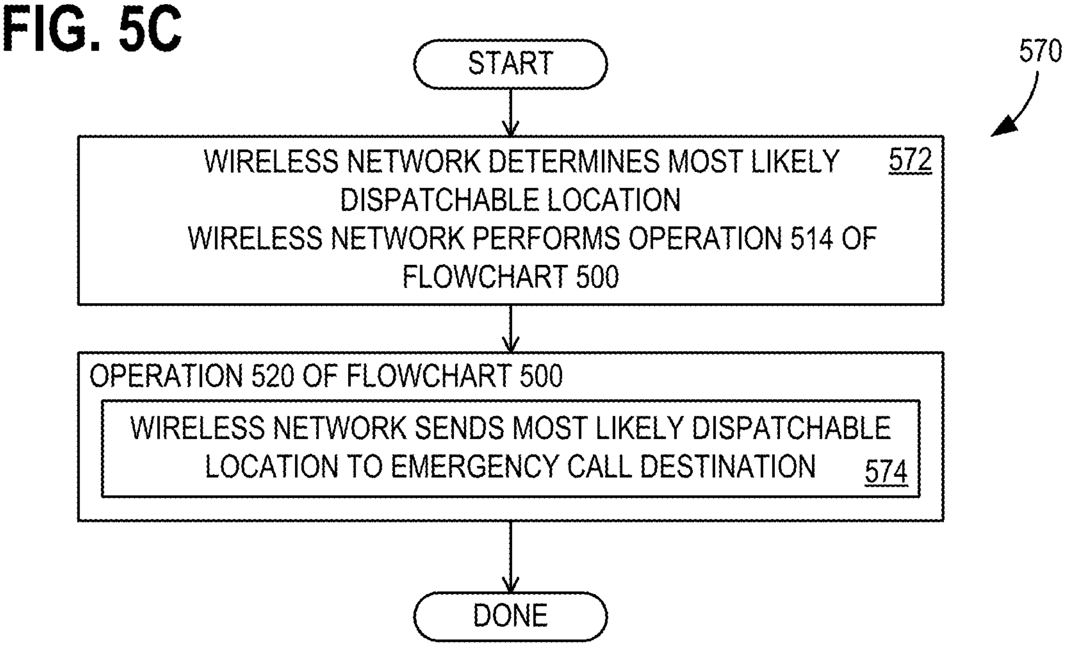

FIG. 5 illustrates a flowchart 500 of exemplary operations associated with examples of architecture 100. FIGS. 5A, 5B, and 5C, described below, illustrate flowcharts 530, 550, and 570, respectively, of optional implementations of flowchart 500. In some examples, at least a portion of flowcharts 500, 530, 550, and 570 may be performed using one or more computing devices 700 of FIG. 7. Flowchart 500 commences with generating set of subscriber addresses 200 to include billing address 210, ID 214 of UE 104, and (possibly) ID 212 of UE 102, when setting up UE 104 in operation 502.

In some examples, operation 502 also includes identifying, by an authorized user of user account 240, alternate use address 220 different than billing address 210 and/or emergency response address 230 (which may be billing address 210, alternate use address 220, or another street address). In some examples, operation 502 further includes adding ID 216 of UE 202 (a guest UE that is not associated with user account 240) to set of subscriber addresses 200.

In operation 504, UE 102 attaches to UE 104 (which is attached to wireless network 110) via short range wireless interface 106, and UE 102 initiates emergency call 132 in operation 506. UE 104 will relay emergency call 132 to wireless network 110. In operation 508, UE 102 determines physical position 302, which may comprises geodetic coordinates. Operation 508 is performed with operation 510, in which UE 102 determines confidence factor 304. In some examples, operation 508 is performed prior to UE 102 initiating emergency call 132 in operation 506.

Dispatchable location logic 400 receives physical position 302 of UE 102 based on at least UE 102 initiating emergency call 132 over short range wireless interface 106, in operation 512. In some examples, dispatchable location logic 400 determines physical position 302 of UE 102 without requiring physical position 302 to be received from UE102 (e.g., with other positioning algorithms, such as time difference of arrival techniques), in operation 512 and so operations 508 and 510 are not needed. In operation 514, dispatchable location logic 400 uses ID 214 of UE 104 and physical position 302 of UE 102 to selecting most likely dispatchable location 402 from among set of subscriber addresses 200 associated with UE 104, such as the subscriber address in set of subscriber addresses 200 that is closest to physical position 302 of UE 102. In some examples, operation 514 is performed contingent upon confidence factor 304 meeting some confidence criteria.

In some examples, operation 514 is performed using operations 516 and 518. Operation 516 identifies that set of subscriber addresses 200 includes both an ID of UE 102 and ID 214 of UE 104. Either UE 102 and UE 104 are both associated with user account 240 and so both have the same billing address 210, or UE 102 is associated with most likely dispatchable location 402 via set of subscriber addresses 200 that includes ID 212 of UE 102 with another address (i.e., UE 102 is a guest UE). Operation 518 determines confidence factor 404 while selecting most likely dispatchable location 402, possibly using confidence factor 304.

Operation 520 forwards most likely dispatchable location 402 to emergency call destination 130 with emergency call 132. Operation 522, which may be part of operation 520, forwards physical position 302 of UE 102 and confidence factor 304 of physical position 302, and/or confidence factor 404 of most likely dispatchable location 402, to emergency call destination 130.

FIG. 5A shows a flowchart 530 that modifies flowchart 500 when UE 102 identifies most likely dispatchable location 402 (i.e., dispatchable location logic 400 is within UE 102). In operation 532, UE 102 retrieves at least a portion of set of subscriber addresses 200, possibly using an app, similar to on-boarding app 250. In operation 534, UE 102 retrieves ID 214 of UE 104, possibly during operation 504 of flowchart 500, when UE 102 attached to UE 104. Operations 532 and 534 of flowchart 530 are performed prior to operation 514, when flowchart 530 modifies flowchart 500 (i.e., flowchart 530 is used in conjunction with flowchart 500).

UE 102 identifies most likely dispatchable location 402 in operation 536, which means that UE 102 is performing operation 514 of flowchart 500. Operation 520 of flowchart 500 is expanded in flowchart 530 to include operations 538, 540, and 542. In operation 538, UE 102 transmits most likely dispatchable location 402 to UE 104 (over short range wireless interface 106). In operation 540, UE 104 transmits most likely dispatchable location 402 to wireless network 110 (over air interface 108). In operation 542, wireless network 110 transmits most likely dispatchable location 402 to emergency call destination 130.

FIG. 5B shows a flowchart 550 that modifies flowchart 500 when UE 104 identifies most likely dispatchable location 402 (i.e., dispatchable location logic 400 is within UE 104). In operation 552, UE 104 retrieves at least a portion of set of subscriber addresses 200, possibly using on-boarding app 250. UE 104 has ID 212 of UE 102 from operation 504 of flowchart 500, when UE 102 attached to UE 104. Operations 552 of flowchart 550 is performed prior to operation 514, when flowchart 550 modifies flowchart 500 (i.e., flowchart 550 is used in conjunction with flowchart 500).

UE 104 identifies most likely dispatchable location 402 in operation 554, which means that UE 104 is performing operation 514 of flowchart 500. Operation 520 of flowchart 500 is expanded in flowchart 550 to include operations 556 and 558. In operation 556, UE 104 transmits most likely dispatchable location 402 to wireless network 110 (over air interface 108). In operation 558, wireless network 110 transmits most likely dispatchable location 402 to emergency call destination 130.

FIG. 5C shows a flowchart 570 that modifies flowchart 500 when wireless network 110 identifies most likely dispatchable location 402 (i.e., dispatchable location logic 400 is within wireless network 110). Wireless network 110 already has set of subscriber addresses 200, obtains ID 214 of UE 104 when UE 104 attached to wireless network 110, and obtains ID 212 of UE 102 when UE 102 initiates emergency call 132.

Figure 6:
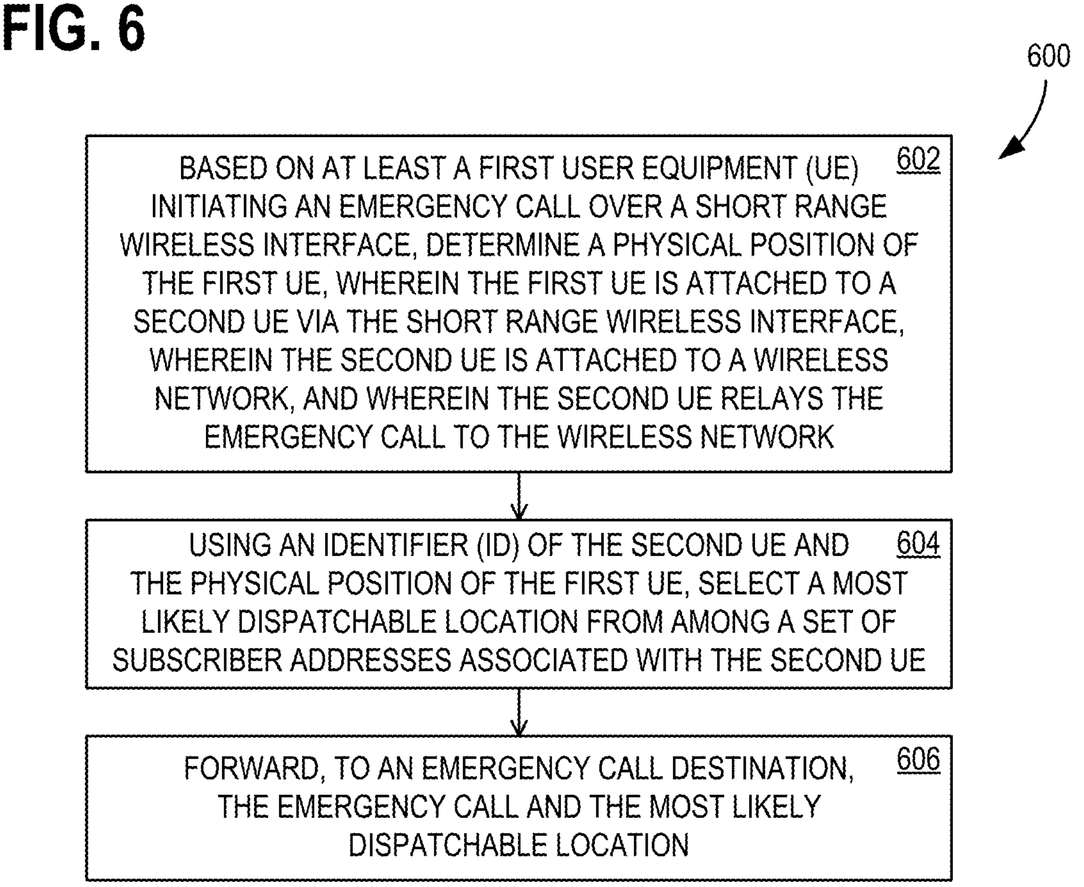
FIG. 6 illustrates another flowchart of exemplary operations associated with the architecture of FIG. 1.

Wireless network 110 identifies most likely dispatchable location 402 in operation 572, which means that wireless network 110 is performing operation 514 of flowchart 500. Operation 520 of flowchart 500 is clarified in flowchart 550 to include operation 574. In operation 574, wireless network 110 transmits most likely dispatchable location 402 to emergency call destination 130.

forwarding emergency call 132 and most likely dispatchable location 402 to emergency call destination 130, comprises transmitting, by wireless network 110, to emergency call destination 130, most likely dispatchable location 402;

FIG. 6 illustrates a flowchart 600 of exemplary operations associated with architecture 100. In some examples, at least a portion of flowchart 600 may be performed using one or more computing devices 700 of FIG. 7. Flowchart 600 commences with operation 602, which includes based on at least a first UE initiating an emergency call over a short range wireless interface, determining a physical position of the first UE, wherein the first UE is attached to a second UE via the short range wireless interface, wherein the second UE is attached to a wireless network, and wherein the second UE relays the emergency call to the wireless network.

Operation 604 includes, using an ID of the second UE and the physical position of the first UE, selecting a most likely dispatchable location from among a set of subscriber addresses associated with the second UE. Operation 606 includes forwarding, to an emergency call destination, the emergency call and the most likely dispatchable location.

Figure 7:
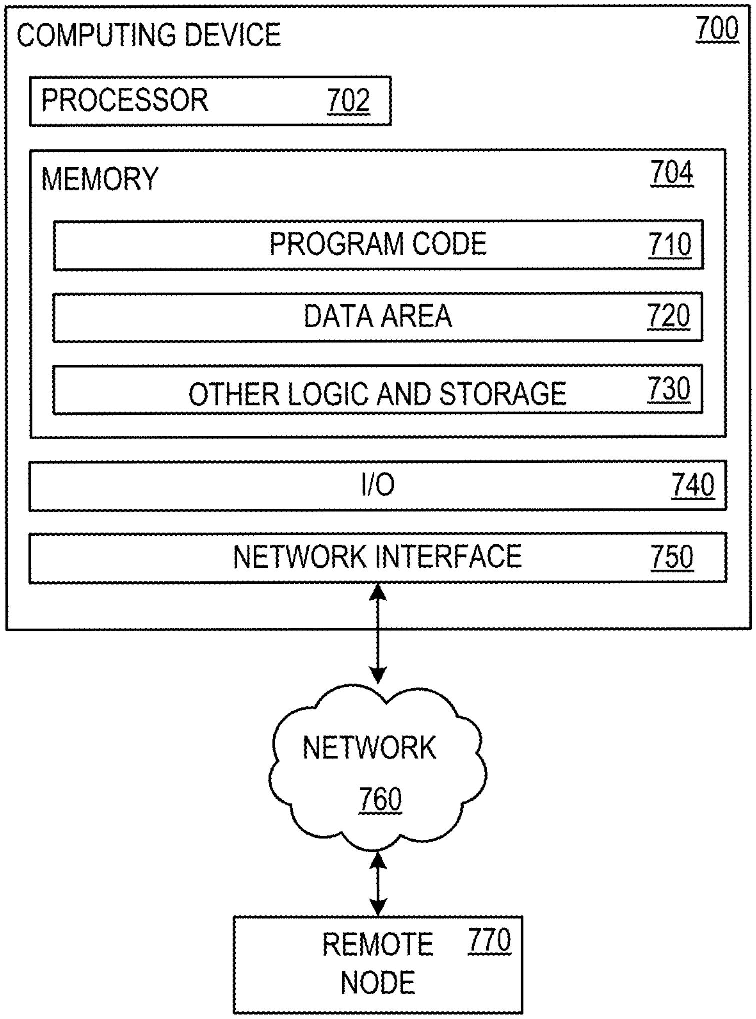
FIG. 7 illustrates a block diagram of a computing device suitable for implementing various aspects of the disclosure.

FIG. 7 illustrates a block diagram of computing device 700 that may be used as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including instructions used to perform operations described herein. Data area 720 holds data used to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over external network 760 with a remote node 770, which may represent another implementation of computing device 700. For example, a remote node 770 may represent another of the above-noted nodes within architecture 100.

Additional Examples

An example system comprises: a processor; and a computer-readable medium storing instructions that are operative upon execution by the processor to: based on at least a first UE initiating an emergency call over a short range wireless interface, determine a physical position of the first UE, wherein the first UE is attached to a second UE via the short range wireless interface, wherein the second UE is attached to a wireless network, and wherein the second UE relays the emergency call to the wireless network; using an ID of the second UE and the physical position of the first UE, select a most likely dispatchable location from among a set of subscriber addresses associated with the second UE; and forward, to an emergency call destination, the emergency call and the most likely dispatchable location.

An example method of wireless communication comprises: based on at least a first UE initiating an emergency call over a short range wireless interface, determining a physical position of the first UE, wherein the first UE is attached to a second UE via the short range wireless interface, wherein the second UE is attached to a wireless network, and wherein the second UE relays the emergency call to the wireless network; using an ID of the second UE and the physical position of the first UE, selecting a most likely dispatchable location from among a set of subscriber addresses associated with the second UE; and forwarding, to an emergency call destination, the emergency call and the most likely dispatchable location.

One or more example computer storage devices has computer-executable instructions stored thereon, which, upon execution by a computer, cause the computer to perform operations comprising: based on at least a first UE initiating an emergency call over a short range wireless interface, determining a physical position of the first UE, wherein the first UE is attached to a second UE via the short range wireless interface, wherein the second UE is attached to a wireless network, and wherein the second UE relays the emergency call to the wireless network; using an ID of the second UE and the physical position of the first UE, selecting a most likely dispatchable location from among a set of subscriber addresses associated with the second UE; and forwarding, to an emergency call destination, the emergency call and the most likely dispatchable location.

Alternatively, or in addition to the other examples described herein, examples include any combination of the following:

- the first UE comprises a cellular handset enabled for WiFi calling;
- the second UE comprises an FWA unit;
- the short range wireless interface comprises WiFi;
- the wireless network comprises a cellular network;
- the physical position of the first UE comprises geodetic coordinates;
- the most likely dispatchable location comprises a street address;
- the set of subscriber addresses comprises one or more street addresses;
- the set of subscriber addresses includes a first billing address of a first user account associated with the second UE;
- the emergency call destination comprises a PSAP;
- the emergency call comprises a 911 call or a 112 call;
- determining the physical position of the first UE comprises receiving the physical position from the first UE;
- selecting the most likely dispatchable location comprises identifying that the set of subscriber addresses includes both an ID of the first UE and the ID of the second UE;
- generating the set of subscriber addresses to include the first billing address, the ID of the first UE, and the ID of the second UE;
- the first UE is associated with a second user account having a second billing address different than the first billing address;
- the first UE is associated with the most likely dispatchable location via the set of subscriber addresses including the ID of the first UE;
- forwarding, to the emergency call destination, the physical position of the first UE and a first confidence factor of the physical position;
- forwarding, to the emergency call destination, a second confidence factor of the most likely dispatchable location;
- the first UE identifies the most likely dispatchable location;
- retrieving, by the first UE, at least a portion of the set of subscriber addresses;
- retrieving, by the first UE, the ID of the second UE;
- forwarding the emergency call and the most likely dispatchable location to the emergency call destination, comprises transmitting, by the first UE, to the second UE, the most likely dispatchable location;
- the second UE identifies the most likely dispatchable location;
- retrieving, by the second UE, at least a portion of the set of subscriber addresses;
- forwarding the emergency call and the most likely dispatchable location to the emergency call destination, comprises transmitting, by the second UE, to the wireless network, the most likely dispatchable location;
- the wireless network identifies the most likely dispatchable location;
- forwarding the emergency call and the most likely dispatchable location to the emergency call destination, comprises transmitting, by the wireless network, to the emergency call destination, the most likely dispatchable location;
- the first UE determines its physical position using a GPS component, A-GPS, short range radio station identification, and/or identification of in-range radio sites of the wireless network;
- the first UE determines the first confidence factor;
- the first confidence factor is expressed as a range of positions, such that the physical position of the first UE is within the range of positions with a first confidence threshold;
- the first UE attaches to the second UE via the short range wireless interface;
- initiating, by the first UE, the emergency call;
- the first UE comprises a personal computer enabled for VOIP calls;
- the emergency call comprises a VOIP call;
- selecting and forwarding the most likely dispatchable location are each based on at least the first confidence factor meeting confidence criteria;
- an E-SMLC of the wireless network identifies the most likely dispatchable location;
- determining the second confidence factor while selecting the most likely dispatchable location;
- determining the second confidence factor using the first confidence factor;
- the second confidence factor is expressed as a set of street addresses, such that the first UE is located at a street address within the set of street addresses with a second confidence threshold;
- the second confidence factor is expressed as a confidence value that the UE is located at the most likely dispatchable location;
- the most likely dispatchable location is the subscriber address in the set of subscriber addresses that is closest to the physical position of the first UE;
- the short range wireless interface comprises Bluetooth;
- the short range radio station identification comprises identification of in-range WiFi and/or Bluetooth stations;
- the identification of in-range radio sites of the wireless network comprises Cell ID;
- the first UE determines its physical position using a barometer of the first UE;
- generating the set of subscriber addresses comprises identifying, by an authorized user of the first user account, an emergency response address;
- identifying the emergency response address comprises confirming the first billing address as the emergency response address;

generating the set of subscriber addresses comprises identifying, by the authorized user of the first user account, an alternate use address different than the first billing address;

the emergency response address comprises the first billing address;

the emergency response address is different than the first billing address;

generating the set of subscriber addresses comprises adding an ID of a guest UE that is not associated with the first user account;

the first UE and the second UE are both associated with the first user account and both have the first billing address;

selecting the most likely dispatchable location comprises identifying that the first UE has the first billing address;

the ID of the first UE, the ID of the second UE, and the ID of the guest UE each comprises a MAC address; and contextually aware AI identifies the most likely dispatchable location.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

based on at least a first user equipment (UE) initiating an emergency call over a short range wireless interface, determining a physical position of the first UE, wherein the first UE is attached to a second UE via the short range wireless interface, wherein the second UE is attached to a wireless network, and wherein the second UE relays the emergency call to the wireless network;

using an identifier (ID) of the second UE and the physical position of the first UE, selecting a most likely dispatchable location from among a set of subscriber addresses associated with the second UE; and forwarding, to an emergency call destination, the emergency call and the most likely dispatchable location.

2. The method of claim 1, wherein the first UE comprises a cellular handset enabled for WiFi calling;

wherein the second UE comprises a fixed wireless access (FWA) unit;

wherein the short range wireless interface comprises WiFi;

wherein the wireless network comprises a cellular network;

wherein the physical position of the first UE comprises geodetic coordinates;

wherein the most likely dispatchable location comprises a street address;

wherein the set of subscriber addresses comprises one or more street addresses, including a first billing address of a first user account associated with the second UE;

wherein the emergency call destination comprises a public safety answering point (PSAP); and wherein the emergency call comprises a 911 call or a 112 call.

3. The method of claim 2, wherein selecting the most likely dispatchable location comprises:

identifying that the set of subscriber addresses includes both an ID of the first UE and the ID of the second UE.

4. The method of claim 3, further comprising:

generating the set of subscriber addresses to include the first billing address, the ID of the first UE, and the ID of the second UE, wherein the first UE is associated with a second user account having a second billing address different than the first billing address, and wherein the first UE is associated with the most likely dispatchable location via the set of subscriber addresses including the ID of the first UE.

5. The method for claim 1, further comprising:

forwarding, to the emergency call destination, either:

the physical position of the first UE and a first confidence factor of the physical position; or a second confidence factor of the most likely dispatchable location.

6. The method for claim 1, wherein the first UE identifies the most likely dispatchable location, and wherein the method further comprises:

retrieving, by the first UE, at least a portion of the set of subscriber addresses; and retrieving, by the first UE, the ID of the second UE, wherein forwarding the emergency call and the most likely dispatchable location to the emergency call destination, comprises:

transmitting, by the first UE, to the second UE, the most likely dispatchable location;

transmitting, by the second UE, to the wireless network, the most likely dispatchable location; and transmitting, by the wireless network, to the emergency call destination, the most likely dispatchable location.

7. The method for claim 1, wherein the second UE identifies the most likely dispatchable location, and wherein the method further comprises:

retrieving, by the second UE, at least a portion of the set of subscriber addresses, wherein forwarding the emergency call and the most likely dispatchable location to the emergency call destination, comprises:

transmitting, by the second UE, to the wireless network, the most likely dispatchable location; and transmitting, by the wireless network, to the emergency call destination, the most likely dispatchable location.

8. The method for claim 1, wherein the wireless network identifies the most likely dispatchable location, and wherein forwarding the emergency call and the most likely dispatchable location to the emergency call destination, comprises:

transmitting, by the wireless network, to the emergency call destination, the most likely dispatchable location.

9. A system comprising:

a processor; and a computer-readable medium storing instructions that are operative upon execution by the processor to:

based on at least a first user equipment (UE) initiating an emergency call over a short range wireless interface, determine a physical position of the first UE, wherein the first UE is attached to a second UE via the short range wireless interface, wherein the second UE is attached to a wireless network, and wherein the second UE relays the emergency call to the wireless network;

using an identifier (ID) of the second UE and the physical position of the first UE, select a most likely dispatchable location from among a set of subscriber addresses associated with the second UE; and forward, to an emergency call destination, the emergency call and the most likely dispatchable location.

10. The system of claim 9, wherein the first UE comprises a cellular handset enabled for WiFi calling;

wherein the second UE comprises a fixed wireless access (FWA) unit;

wherein the short range wireless interface comprises WiFi;

wherein the wireless network comprises a cellular network;

wherein the physical position of the first UE comprises geodetic coordinates;

wherein the most likely dispatchable location comprises a street address;

wherein the set of subscriber addresses comprises one or more street addresses, including a first billing address of a first user account associated with the second UE;

wherein the emergency call destination comprises a public safety answering point (PSAP); and wherein the emergency call comprises a 911 call or a 112 call.

11. The system of claim 10, wherein selecting the most likely dispatchable location comprises:

identifying that the set of subscriber addresses includes both an ID of the first UE and the ID of the second UE.

12. The system of claim 11, wherein the instructions are further operative to:

generate the set of subscriber addresses to include the first billing address, the ID of the first UE, and the ID of the second UE, wherein the first UE is associated with a second user account having a second billing address different than the first billing address, and wherein the first UE is associated with the most likely dispatchable location via the set of subscriber addresses including the ID of the first UE.

13. The system of claim 9, wherein the instructions are further operative to:

forward, to the emergency call destination, either:

the physical position of the first UE and a first confidence factor of the physical position; or a second confidence factor of the most likely dispatchable location.

14. The system of claim 9, wherein the first UE identifies the most likely dispatchable location, and wherein the instructions are further operative to:

retrieve, by the first UE, at least a portion of the set of subscriber addresses; and retrieve, by the first UE, the ID of the second UE, wherein forwarding the emergency call and the most likely dispatchable location to the emergency call destination, comprises:

transmitting, by the first UE, to the second UE, the most likely dispatchable location;

transmitting, by the second UE, to the wireless network, the most likely dispatchable location; and transmitting, by the wireless network, to the emergency call destination, the most likely dispatchable location.

15. The system of claim 9, wherein the second UE identifies the most likely dispatchable location, and wherein the instructions are further operative to:

retrieve, by the second UE, at least a portion of the set of subscriber addresses, wherein forwarding the emergency call and the most likely dispatchable location to the emergency call destination, comprises:

transmitting, by the second UE, to the wireless network, the most likely dispatchable location; and transmitting, by the wireless network, to the emergency call destination, the most likely dispatchable location.

16. The system of claim 9, wherein the wireless network identifies the most likely dispatchable location, and wherein forwarding the emergency call and the most likely dispatchable location to the emergency call destination, comprises:

transmitting, by the wireless network, to the emergency call destination, the most likely dispatchable location.

17. One or more computer storage devices having computer-executable instructions stored thereon, which, upon execution by a computer, cause the computer to perform operations comprising:

based on at least a first user equipment (UE) initiating an emergency call over a short range wireless interface, determining a physical position of the first UE, wherein the first UE is attached to a second UE via the short range wireless interface, wherein the second UE is attached to a wireless network, and wherein the second UE relays the emergency call to the wireless network;

using an identifier (ID) of the second UE and the physical position of the first UE, selecting a most likely dispatchable location from among a set of subscriber addresses associated with the second UE; and forwarding, to an emergency call destination, the emergency call and the most likely dispatchable location.

18. The one or more computer storage devices of claim 17, wherein the wireless network comprises a cellular network;

wherein the most likely dispatchable location comprises a street address;

wherein the set of subscriber addresses comprises one or more street addresses wherein the emergency call destination comprises a public safety answering point (PSAP); and wherein the emergency call comprises a 911 call or a 112 call.

19. The one or more computer storage devices of claim 18, wherein selecting the most likely dispatchable location comprises:

identifying that the set of subscriber addresses includes both an ID of the first UE and the ID of the second UE.

20. The one or more computer storage devices of claim 17, wherein the operations further comprise:

forwarding, to the emergency call destination, a confidence factor of the most likely dispatchable location.

* * * * *